UNITED STATES PATENT OFFICE.

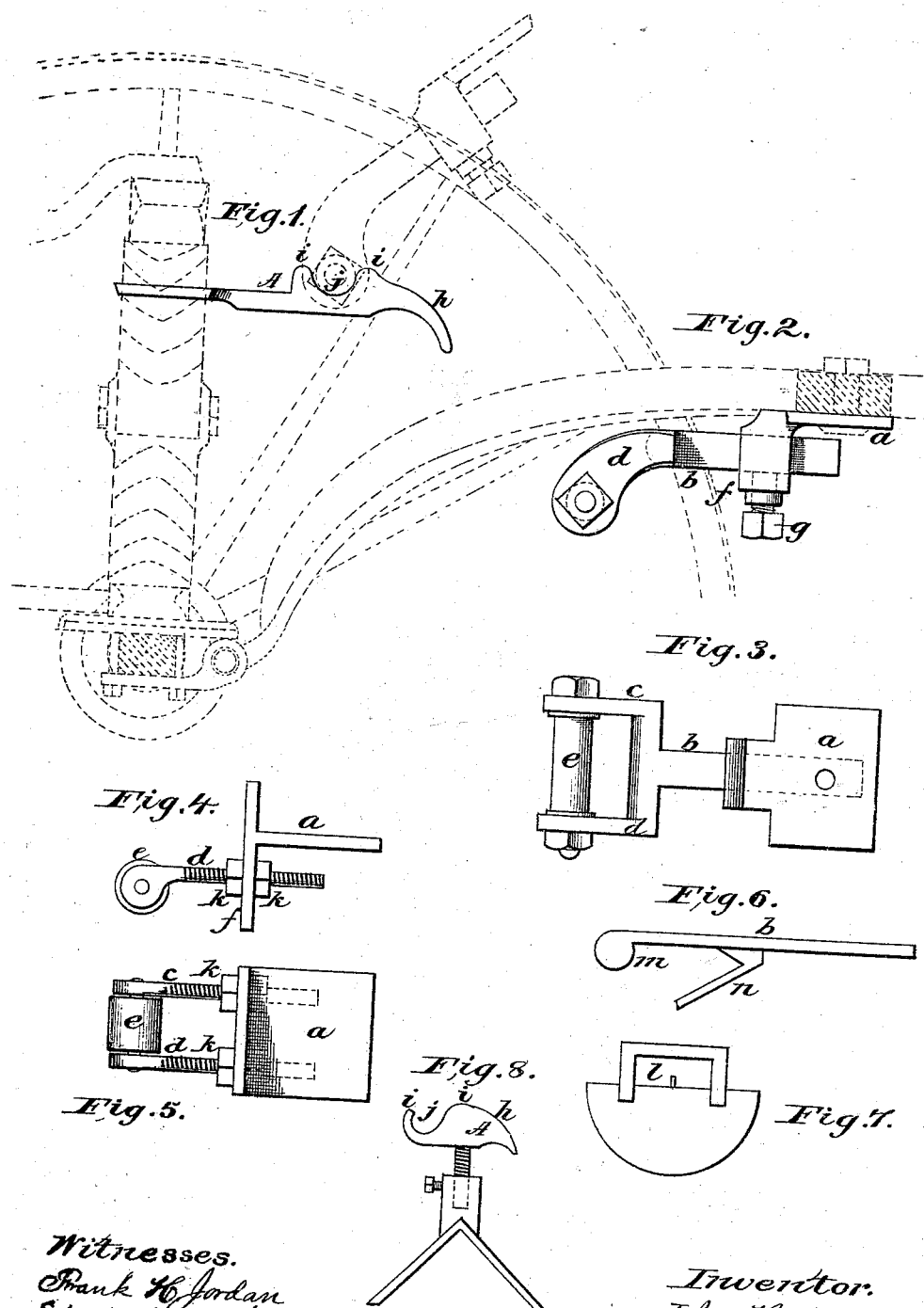

JOHN H. ADAMS, OF PORTLAND, MAINE.

IMPROVEMENT IN SHAFT-HOLDING ATTACHMENTS.

Specification forming part of Letters Patent No. 147,465, dated February 17, 1874; application filed November 25, 1873.

*To all whom it may concern:*

Be it known that I, JOHN H. ADAMS, of Portland, in the county of Cumberland and State of Maine, have invented certain new and useful Improvements in Shaft-Holding Attachments; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figures 1 and 2 are side views of my invention. Fig. 3 is a top plan of Fig. 2. Fig. 4 is a side view of a modification of Figs. 2 and 3. Fig. 5 is a top plan view of Fig. 4. Figs. 6, 7, and 8 are modifications.

Same letters show like parts.

The object of my invention is to produce a simple device to be attached to the cross-bar of the shafts of a carriage, which is so constructed as to work in combination with another device which is fastened to the under side of the carriage-body or to the carriage-spring to hold the shafts in an elevated or raised position when desired. These devices are so arranged that when they come together the one on the cross-bar of the shafts will strike the one that is fastened to the carriage body or spring, and will force the body downward, or, in other words, contract the carriage-spring until a roller which is on the device fastened to the cross-bar shall have passed or rolled over a projection on the one attached to the spring or body of the carriage. The shafts of the carriage thus being raised will be held in that position by the tendency of the carriage-spring (which it contracts, as before described,) to expand or spring upward.

My invention may be thus described: *a* shows the device to be attached to the under side of the cross-bar of the shafts; *b*, another device which works in *a*, consisting of a frame with two projecting arms, *c d*, which hold a roller, *e*. *b* works through a downward-projecting part, *f*, shown in Fig. 2. The object of this is to make the roller *e* adjustable. It is so made adjustable by means of the set-screw *g*, which fits recesses or indentations in the lower side of *b*. The device *a*, which I attach to the under side of the carriage-body or to the spring of the carriage, as may be desired, consists simply of a single piece of metal shown in Fig. 1, having its outer end bent downward, as shown at *h*, and being provided with the projecting parts *i i*, so as to make a recess, *j*. This is fastened to the carriage body or spring in the same or similar manner as the device *a* is attached to the cross-bar of the shafts.

The operation may be thus described: The device *a*, which carries the frame *b* and its accompanying devices, being fastened to the under side of the cross-bar, which connects the shafts of the carriage; and if it is desired to have the shafts or arms of the carriage held aloft, all that is necessary to do is to raise the shafts to a sufficient height, when the roller *e* will strike the part *h*, shown in Fig. 1, (it being understood, of course, that the device shown in Fig. 1 is fastened to the carriage body or spring, as before described,) and as the shafts are continued to be raised this roller rolls up the bent end *h*, and must of a consequence force down or contract the spring of the carriage. After the said shafts have been raised to a sufficient height to allow the roller *e* to pass over the projection *i* and drop into the recess *j*, they will be held in this position by reason of the tendency of the spring to expand or spring upward. The frame *b* is made to slide in the part *f* of the frame *a*, and is held at any required point by means of the set-screw *g*, which, when being screwed up or tightened, forces its end into a recess in the lower edge or side of *b*, and thus holds it, *b*, firmly in position. The object of having the frame *b* adjustable is to accommodate the roller *e* to shafts that have cross-bars that vary in distance from the body or spring of the carriage.

Figs. 4 and 5 show another method of making the roller *e* adjustable. It is apparent that this is but a modification of the means shown in Figs. 2 and 3. The arms *c d* in this case, instead of coming together and forming a single arm, *b*, as in Fig. 2, are separate and pass through the projecting part *f* of the frame *a*, and are held in place by nuts *k k*, which nuts work on threads cut in the said arms *c d*.

Fig. 8 shows a similar method of making the device, which is attached to the spring of the carriage adjustably. Fig. 7 is a side view of the lower portion of Fig. 8, and shows a space through which passes a clip or clasp that holds this device fastened to a carriage-spring. $l$ is a point, which passes through an aperture in this clasp and serves to hold it securely.

It is evident that the frame $b$ may be attached to the cross-bar, but in this case it would not be adjustable—that is to say, the roller $e$ would remain in one position and would be unadjustable.

If desired, a device similar to that shown in Fig. 6 may be used, instead of either of those shown in Figs. 2, 3, 4, and 5. This consists of a single piece of metal having the projecting part $m$ and the lever or brace $n$. This is to be fastened to the shafts in the same manner as the devices herein named. The purpose of the lever $n$ is to act as a brace and assist in disengaging the part $m$ from the recess $j$ when the arms or shafts of the carriage are elevated. When the said shafts are held aloft by this device and it is desired to lower the same or disengage them a movement downward on said shafts brings the brace $n$ against the part $h$, and thus a leverage is obtained, which allows the part $m$ to be easily raised out of the recess $j$.

It is evident that when the shafts of the carriage are held elevated by either of these devices a slight pull downward will free the same.

I do not limit myself to any material for the roller $e$, but would specify that rubber, gutta-percha, or other equivalent substance can be used to advantage. It is obvious that the weight of the shafts will serve to hold them in a raised position after the roller $e$ has passed into the recess $j$, but, of course, the ac-action of the carriage-spring would greatly assist. It is evident that these devices can, by a simple arrangement, be attached to a sleigh, so that by having a suitable spring fastened to the sleigh in the proper place I can effect the same result as is derived when they are applied to a carriage.

What I claim as my invention, and desire to secure by Letters Patent, is—

1. The combination of the part $h$ with a carriage-spring, for the purpose of utilizing the expansion of the spring to support the shafts when in an elevated position, as set forth.

2. The combination of the frame $a$, set-screw $g$, frame $b$ having the arms $c$ $d$, and roller $e$, with the device $a$, having the projections $i$ $i$, recess $j$, and bent portion $h$, when applied to a carriage, as described.

In testimony that I claim the foregoing I have hereunto set my hand this 20th day of November, 1873.

JOHN H. ADAMS.

Witnesses:
 WM. HENRY CLIFFORD,
 FRANK H. JORDAN.